US006594544B2

(12) United States Patent
Nagler

(10) Patent No.: US 6,594,544 B2
(45) Date of Patent: Jul. 15, 2003

(54) METHOD FOR AUTOMATED PLACEMENT OF ARTICLES ONTO A SUPPORT

(75) Inventor: Peter Nagler, Fellbach (DE)

(73) Assignee: imt robot AG, Fellbach (DE)

( * ) Notice: Subject to any disclaimer, the term of this patent is extended or adjusted under 35 U.S.C. 154(b) by 0 days.

(21) Appl. No.: 10/065,367

(22) Filed: Oct. 10, 2002

(65) Prior Publication Data

US 2003/0069666 A1 Apr. 10, 2003

(30) Foreign Application Priority Data

Oct. 10, 2001 (DE) .......................... 101 49 855
Dec. 6, 2001 (DE) .......................... 101 60 061

(51) Int. Cl.⁷ ............................................... G06F 7/00
(52) U.S. Cl. ..................... 700/219; 700/218; 700/220
(58) Field of Search .................. 700/218, 219, 700/220, 226, 230; 198/502.2, 502.3

(56) References Cited

U.S. PATENT DOCUMENTS

| | | | | |
|---|---|---|---|---|
| 4,959,795 A | * | 9/1990 | Christensen et al. ........ | 700/220 |
| 5,040,056 A | * | 8/1991 | Sager et al. ................. | 700/230 |
| 5,537,946 A | * | 7/1996 | Sadeh et al. ........... | 112/475.03 |
| 5,838,573 A | * | 11/1998 | Crathern et al. ............ | 700/230 |
| 6,148,249 A | * | 11/2000 | Newman ..................... | 700/226 |

* cited by examiner

Primary Examiner—Christopher P. Ellis
Assistant Examiner—Gene O. Crawford
(74) Attorney, Agent, or Firm—Gudrun E. Huckett

(57) ABSTRACT

In a method for automated placement of articles onto a support, the supports and articles are positioned on a supply belt and the supports and the articles are supplied on the supply belt to a detection device where output signals are created based on the supports and the articles passing through the detection device. The output signals are transmitted as measured data to a control unit. The supports and the articles are recognized and differentiated in the control unit based on the measured data. Subsequently, the control unit, according to predetermined criteria, controls one or more gripping devices connected to the control unit for carrying out a placement step of placing the articles on the supports.

18 Claims, 1 Drawing Sheet

METHOD FOR AUTOMATED PLACEMENT OF ARTICLES ONTO A SUPPORT

BACKGROUND OF INVENTION

1. Field of the Invention

The invention relates to a method for automated placement of articles onto a support.

2. Description of the Related Art

Articles are usually offered in packages to the consumer wherein the packages can contain articles of the same or different kind. For example, in the food industry, packages of baked goods with identical or different types of baked goods or sweets are offered, for example, chocolate mixtures or the like. The placement of the identical or different articles into the packages is usually carried out by hand. Robots have already been proposed for taking over this type of manual labor.

When robots are used for placing identical or different articles on supports, a high efficiency must be achieved for obtaining shortest possible cycle times.

SUMMARY OF INVENTION

It is an object of the present invention to provide a method for automated placement of articles onto a support, which ensures a high placement efficiency while providing a gentle handling of the articles with minimal machine requirements.

In accordance with the present invention, this is achieved in that the support and the articles are positioned on a supply belt and are supplied to a detection device whose output signals are transmitted as measured data to a control unit. The control unit, based on the measured data, recognizes and differentiates the articles as well as the supports, wherein the control unit, after detection and differentiation of the articles and of the support, controls, based on predetermined criteria, a gripping device connected to the control unit, and carries out a placement step.

Initially, the articles to be packaged of the same or different kind are placed together with the support, for example, a package, a tray, a pizza crust, a cake crust or the like, onto a supply belt, wherein for carrying out the method the arrangement on the supply belt can be ordered, partially ordered or random. For example, the random arrangement of the articles and of the supports on the supply belt is detected by a detection device whose output signals are transmitted as measured data to a control unit. The control unit recognizes, based on the detection data (measured data), the articles as well as the supports, differentiates them, and, after recognition and differentiation of the articles, places the articles according to predetermined criteria onto the support by means of a gripping device connected to the control unit.

According to a special embodiment of the invention, the control unit, before carrying out a placement step by the gripping device, will start an internal simulation with which the placement step of an article onto the support is carried out virtually by the gripping device connected to the control unit. The performed simulations are evaluated and, based on predetermined or set criteria, one of the simulations is selected as a suitable one for an optimal placement step. Subsequently, the gripping device connected to the control unit is controlled in accordance with the selected simulation in order to grip the article which is positioned in a certain position and to place it quickly but gently onto the support in a way suitable for the external conditions.

When several gripping devices are connected to the control unit, it is also determined by means of simulations which individual one of the gripping devices arranged sequentially in the moving direction of the supply belt is suitable for the desired placement step.

The simulation can be realized in a simple way as a boolean operation. Preferably, the simulation is carried out according to a suitable algorithm so that not only product-specific parameters and/or construction-related parameters of the gripping device are included in the simulation but, preferably, also position-dependent and/or movement-dependent parameters of the gripping device are taken into account. For this purpose, the control unit is provided expediently as a computer with a corresponding high performance microprocessor. For creating a data base (data knowledge), it is also possible to employ neuronal and/or fuzzy-logic operations.

A precise detection of the articles and also of the supports is ensured in particular when the control unit detects and differentiates the articles based on a comparison of the measured data with saved article-specific basic data. For example, a plurality of shapes and patterns can be saved by the computer as a data pool in a data storage device (memory). In this way, the device is suitable, without requiring complex retrofitting actions, for a plurality of different types of articles and supports. It can be used for placement of sweets, such as chocolates or cookies, into packages as well as for combining articles to assortments, for example, in the case of screws or plugs (anchors) or for topping pizza crusts, cake or pie crusts, sandwiches, hamburgers or the like.

DETAILED DESCRIPTION

Figure 1:
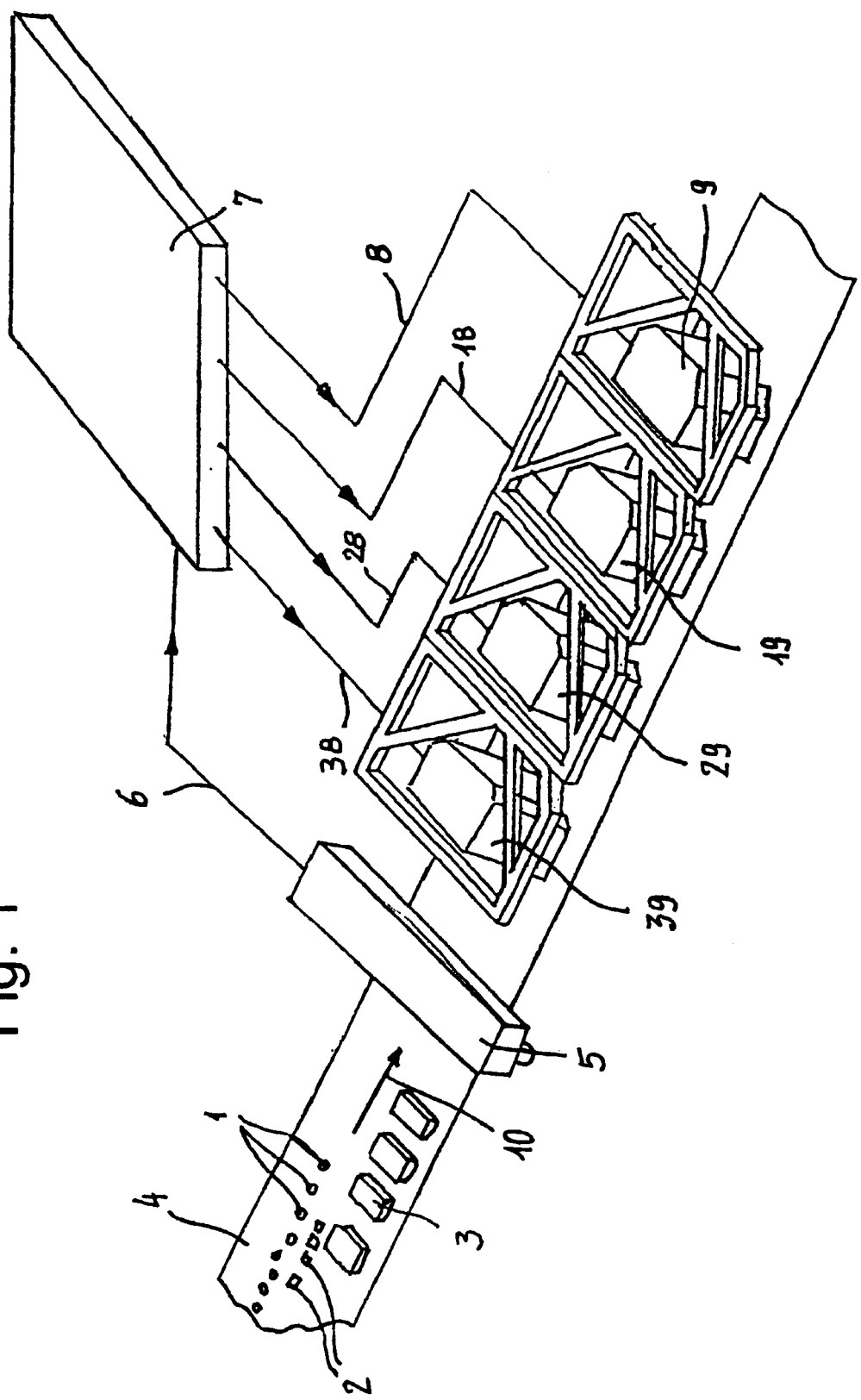
FIG. 1 is a schematic perspective view of a device for performing the method according to the invention.

The only Figure (FIG. 1) shows schematically a device suitable for performing the method according to the invention for automated placement of articles onto supports. The device is comprised substantially of a supply belt 4 which moves in the direction of arrow 10 on which a plurality of supports 3, such as packages, trays, pizza or cake (pie) layers or the like, as well as several articles 1 and 2 to be placed onto the supports 3 are positioned. The articles 1 and 2 and/or the supports 3 can be positioned in an ordered, partially ordered or random arrangement on the supply belt 4. For increasing the output of the device, roughly predetermined positions of the articles as well as of the supports may be expedient.

The articles can be different, preferably can have different geometric shapes and/or different properties. For example, the articles can be sweets (chocolates, baked goods, and the like), decorative articles (sugar-coated chocolate candies or shapes), cold cuts (cheese, sausage, ham), vegetables (bell peppers, mushrooms) or fruit. The articles can also be technical articles which must be presorted for assembly. For example, the chain members of technical chains or individual components of a module for technical assembly may have to be positioned in an ordered arrangement. In the illustrated embodiment, the first articles 1 of a round configuration and second articles 2 of an angular shape are placed onto the supply belt 4. In a plan view, the articles 1 are circular and the articles 2 are rectangular or square.

The articles 1, 2 are supplied together with the supports 3 transported on the supply belt 4 to a detection device 5 which extends transversely across the width of the supply belt 4. The detection device 5 can have feeler elements or sensing elements for mechanical position and article detection. In the illustrated embodiment, the detection device is an optical detection device, for example, a CCD camera or the like.

The output signals of the detection device 5 are supplied by a data line 6 as measured data to a control unit 7 which evaluates the measured data. This can be realized in a simple way by a boolean operation of the measured data. Preferably, the control unit recognizes the articles 1, 2 and the receiving units (supports) 3 based on a comparison of the measured data with saved, article-specific basic data. After recognition or detection of the supports 3 and of the different articles 1, 2, the control unit 7 is provided with all required information in order to place the articles 1, 2 in a desired arrangement and sequence onto the support 3 by means of the gripping devices 9, 19, 29, and 39 connected to the control unit 7. For this purpose, the gripping devices 9, 19, 29, 39 are controlled via corresponding control lines 8, 18, 28, and 38 by the control unit 7 for performing the desired placement step (process).

In a preferred embodiment of the invention the control unit 7 is a computer and performs a simulation before carrying out the placement step. This simulation can be provided in the form of a simple boolean operation. In a special embodiment of the invention, the simulation is carried out according to an algorithm which processes, in particular, product-specific parameters and/or construction- or configuration-related parameters of the gripping device, preferably, also position-dependent and/or movement-dependent parameters of the gripping device. In the context of the simulation, the placement step of an article 1, 2 on a support 3 is created virtually within the computer. Each simulation result is evaluated based on predetermined criteria in order to then carry out the placement step according to a process selected from the performed simulations. This process has been selected by the control unit 7 based on predetermined criteria as a suitable one for an optimal placement step from the plurality of simulations.

According to the method of the invention, before carrying out the placement step, the articles 1, 2 as well as the support 3 are first detected by means of the detection device and their position within the plane of the supply belt 4 is determined. The measured data, transmitted by the data line 6 to the computer 7, thus provide information in regard to the articles 1, 2 and the support 3 themselves so that the articles and the support can be recognized as such. At the same time, position data can be correlated with the detected article, respectively, based on which the starting point and the target point of a gripping movement and a placement movement of one of the gripping devices 9, 19, 29, 39 can be carried out precisely. By means of the simulation, a placement process with optimized movement course is thus determined which, talking into consideration the technical capabilities of the connected gripping devices 9, 19, 29, 39 ensures a gentle movement of the article on a short path from the starting location to the target location.

With the method according to the invention, a three-dimensional positioning of the articles 1, 2 onto or into the support 3 is also particularly possible so that, for example, packages containing several layers of articles 1, 2 can be produced. In this connection, the articles can be placed in a predetermined sequence, for example, according to a placement algorithm, onto the support 3.

The method can be performed basically with a simple detection device 5, a control unit 7, and a gripping device 9. Preferably, the control unit 7 is a computer which can process a plurality of parameters during the simulation which precedes the actual placement step. In this way, supports of any desired shape can be used to be filled with any desired number of identical or different articles in a single or several layers at a high processing speed. In this way, the computer, assisted by neuronal operations and/or fuzzy logic operations, can be configured so as to be adaptive or compliant (intelligent) so that the comparisons and determinations to be performed can be carried out on a knowledge-based level. The system itself optimizes the placement process based on continuously supplied current data as well as saved data.

The control unit 7 is connected via control lines 8, 18, 28, and 38 to several gripping devices 9, 19, 29, 39 wherein each article of the same type, for example, of the same geometric shape, is advantageously correlated with a certain gripping device. The efficiency of the device can be increased in this way.

By means of the method according to the invention not only monotonous, regularly and repeatedly occurring placing steps can be carried out as, for example, for combining packages for sale. Advantageously, intelligent placement steps can be carried out, for example, the decoration of a cake, placing toppings onto a pizza crust, selecting and placing toppings onto a sandwich or a hamburger, or similar complex tasks. The method can not only be employed in the food sector but also in other fields or industries where articles are produced. For example, it is also possible to combine elements of a modular unit or kit comprising a significant number of different elements by means of the inventive method with a high total output without errors. For example, the individual chain members of a technical chain, for example, those employed in modern automatic transmissions of motor vehicles, can be presorted with the method according to the invention and can be placed in a sequence which is beneficial for the subsequent assembly. Since a large number of different chain members (for example, 30 different chain members) are to be handled, a robot-controlled pre-sorting of the chain members accelerates the production process significantly.

While specific embodiments of the invention have been shown and described in detail to illustrate the inventive principles, it will be understood that the invention may be embodied otherwise without departing from such principles.

What is claimed is:

1. A method for automated placement of articles (1, 2) onto a support (3), the method comprising the steps of:
    positioning supports (3) and articles (1, 2) on a supply belt (4) and supplying the supports (3) and the articles (1, 2) on the supply belt (4) to a detection device (5);
    creating output signals in the detection device (5) based on the supports (3) and the articles (1, 2) passing through the detection device (5);
    transmitting the output signals as measured data to a control unit (7);
    recognizing and differentiating the supports (3) and the articles (1, 2) in the control unit (7) based on the measured data;
    subsequently, controlling with the control unit (7), according to predetermined criteria, one or more gripping devices (9, 19, 29, 39) connected to the control unit (7) for carrying out a placement step of placing the articles (1, 2) on the supports (3).

2. The method according to claim 1, wherein the control unit (7) is a computer comprising a microprocessor.

3. The method according to claim 1, wherein, in the step of recognizing and differentiating, the control unit (7) compares the measured data with article-specific basic data.

4. The method according to claim 1, wherein the detection device (5) is an optical detection device.

5. The method according to claim 1, wherein the articles (1, 2) are placed onto the supports (3) in a three-dimensional pattern.

6. The method according to claim 1, wherein the supports (3) are receptacle, packages, dough layers or dough crusts, or skids.

7. The method according to claim 1, wherein the articles (1, 2) are differently configured.

8. The method according to claim 7, wherein the articles (1, 2) have different geometric shapes, different properties, or different geometric shapes and properties.

9. The method according to claim 1, wherein the articles (1, 2) are placed in a predetermined sequence onto the supports (3).

10. The method according to claim 9, wherein the articles are placed according to a placement algorithm onto the supports (3).

11. The method according to claim 1, wherein the control unit (7) controls several of the gripping devices (9, 19, 29, 39).

12. The method according to claim 11, wherein each one of the articles (1, 2) has correlated therewith a predetermined one of the gripping devices (9, 19, 29, 39).

13. The method according to claim 1, further comprising the steps of:

performing simulations in the control unit (7) before the step of carrying out a placement step, wherein the simulations are virtual placement steps of placing the articles (1, 2) onto the supports (3) carried out by the gripping devices (9, 19, 29, 39) connected to the control unit (7);

selecting by the control unit (7) one of the simulations, based on the predetermined criteria, as an optimal placement process; and, in the step of controlling, moving the gripping device (9, 19, 29, 39) according to the optimal placement process.

14. The method according to claim 13, wherein the simulations are carried out by neuronal operations, fuzzy logic operations, or neuronal and fuzzy logic operations.

15. The method according to claim 13, wherein the predetermined criteria of the control unit (7) comprise data derived from the simulations and data derived from prior placement processes.

16. The method according to claim 13, wherein the simulations process at least one of product-specific parameters, configuration-related parameters of the gripping device, position-dependent parameters of the gripping device, and movement-dependent parameters of the gripping device.

17. The method according to claim 13, wherein the simulations are carried out according to a boolean operation.

18. The method according to claim 17, wherein the simulations are carried out according to an algorithm.

* * * * *